US010467052B2

(12) United States Patent
Chen et al.

(10) Patent No.: US 10,467,052 B2
(45) Date of Patent: Nov. 5, 2019

(54) CLUSTER TOPOLOGY AWARE CONTAINER SCHEDULING FOR EFFICIENT DATA TRANSFER

(71) Applicant: Red Hat, Inc., Raleigh, NC (US)

(72) Inventors: Huamin Chen, Westborough, MA (US); Jay Vyas, Concord, MA (US)

(73) Assignee: RED HAT, INC., Raleigh, NC (US)

( * ) Notice: Subject to any disclaimer, the term of this patent is extended or adjusted under 35 U.S.C. 154(b) by 174 days.

(21) Appl. No.: 15/583,245

(22) Filed: May 1, 2017

(65) Prior Publication Data

US 2018/0314550 A1    Nov. 1, 2018

(51) Int. Cl.
*G06F 9/48* (2006.01)
*H04L 12/42* (2006.01)
*H04L 29/08* (2006.01)

(52) U.S. Cl.
CPC ............ *G06F 9/4881* (2013.01); *H04L 12/42* (2013.01); *H04L 67/10* (2013.01); *H04L 67/1095* (2013.01); *H04L 67/1097* (2013.01); *H04L 67/32* (2013.01); *H04L 2012/421* (2013.01)

(58) Field of Classification Search
None
See application file for complete search history.

(56) References Cited

U.S. PATENT DOCUMENTS

| | | | |
|---|---|---|---|
| 8,938,723 B1 * | 1/2015 | Tormasov | G06F 8/52 717/136 |
| 9,306,870 B1 | 4/2016 | Klein et al. | |
| 9,560,081 B1 * | 1/2017 | Woolward | H04L 63/20 |
| 9,626,120 B1 * | 4/2017 | Jia | G06F 3/0631 |
| 2002/0147611 A1 * | 10/2002 | Greene | G06Q 10/06311 705/1.1 |
| 2013/0238785 A1 * | 9/2013 | Hawk | G06F 9/5072 709/224 |
| 2013/0318371 A1 * | 11/2013 | Hormuth | G06F 1/28 713/320 |

(Continued)

OTHER PUBLICATIONS

Ravi et al., Scheduling Concurrent Applications on a Cluster of CPU-GPU Nodes, dated May 2012 (25 pages).

(Continued)

*Primary Examiner* — Viet D Vu
*Assistant Examiner* — James A Edwards
(74) *Attorney, Agent, or Firm* — K&L Gates LLP

(57) ABSTRACT

A system and method for cluster topology aware container scheduling for efficient data transfer. The method begins by configuring a server architecture that includes an inner ring of servers including a server that is a specialized hardware accelerator that provides a specialized computation, an outer ring of servers that includes central processing unit servers and no specialized hardware accelerator, and a network switch to transfer data between the inner ring and the outer ring of servers. An orchestrator receives a request to execute a container, and the orchestrator reads a latency tolerance of the container, where the latency tolerance can be either a real time or a batch tolerance. The scheduler schedules the container to execute, based on the latency tolerance of the container, in either the inner ring or the outer ring of servers. The orchestrator injects the container with instructions to access the specialized hardware accelerator.

18 Claims, 7 Drawing Sheets

(56) References Cited

U.S. PATENT DOCUMENTS

2017/0148433 A1* 5/2017 Catanzaro ............... G10L 15/02
2018/0101403 A1* 4/2018 Baldini Soares .. G06Q 20/0855
2018/0309821 A1* 10/2018 Byers ...................... H04L 67/12

OTHER PUBLICATIONS

Silla et al., Make your heterogeneous cluster more flexible with remote GPU virtualization, Technical University of Valencia, dated 2015 (134 pages).

* cited by examiner

US 10,467,052 B2

CLUSTER TOPOLOGY AWARE CONTAINER SCHEDULING FOR EFFICIENT DATA TRANSFER

BACKGROUND

Virtualization, such as the use of a virtual machine, may be used to provide some physical components as logical objects in order to allow running various software modules. Virtualization allows, for example, consolidating multiple physical servers into one physical server running multiple virtual machines in order to improve the hardware utilization rate. Virtualization may typically involve a virtual machine executing for intermittent periods of time on one or more physical processors.

A container may be a virtualized object similar to a virtual machine except that, typically, a container may not implement a guest operating system and may, for example, instead utilize a host operating system of a physical machine. One or more applications and/or utilities may execute in a container. A container may have one or more respective, filesystems, memory, devices, network ports, etc. for accessing the physical resources of the physical machine and other resources outside of the physical machine. Specific requests to access physical resources inside or outside of the physical machine may be made through the host operating system.

Typically, containers may be launched to provide extra compute capacity of a type that the container is designed to provide. Containers allow a programmer to quickly scale the deployment of applications to the volume of traffic requesting the applications. Containers may be deployed in a variety of hardware environments. To attempt to maximize the usage of computer hardware through parallel processing using virtualization, it may be advantageous to maximize the density of containers in a given hardware environment, for example, in a multi-tenant cloud.

Containers may be clustered together to perform a more complex function than containers are capable of performing individually. A scheduler may be implemented to allocate containers and clusters of containers to various servers. Depending on the functionality of a container or cluster of containers, there may be advantages for different types of deployment schemes.

SUMMARY

The present disclosure provides new and innovative methods and systems for cluster topology aware container scheduling for efficient data transfer. An example method includes configuring a server architecture that includes servers made up of an inner ring of servers which include at least one server that is a specialized hardware accelerator that provides a specialized computation, an outer ring of servers including central processing unit servers, where no server in the outer ring of servers provides the specialized computation of the specialized hardware accelerator, and a network switch to transfer data between the inner ring of servers and the outer ring of servers.

An orchestrator receives a request to execute a container that requires the specialized computation, and reads a latency tolerance of the container where the latency tolerance can be either a real time tolerance or a batch tolerance. A scheduler schedules the container to execute, based on the latency tolerance of the container, in either the inner ring of servers or the outer ring of servers. The orchestrator injects the container with instructions to access the specialized hardware accelerator.

An example system includes one or more processors, an orchestrator executing on the one or more processors, a scheduler executing on the one or more processors, an inner ring of servers, an outer ring of servers, and a network switch. The inner ring of servers includes at least one server that is a specialized hardware accelerator that provides a specialized computation. The outer ring of servers includes central processing unit servers where no server in the outer ring of servers provides the specialized computation of the specialized hardware accelerator. The network switch transfers data between the inner ring of servers and the outer ring of servers. The orchestrator receives a request to execute a container that requires the specialized computation. The orchestrator reads a latency tolerance of the container, where the latency tolerance is either a real time tolerance or a batch tolerance. The scheduler schedules the container to execute, based on the latency tolerance of the container, in either the inner ring of servers or the outer ring of servers. The orchestrator injects the container with instructions to access the specialized hardware accelerator.

Additional features and advantages of the disclosed methods and system are described in, and will be apparent from, the following Detailed Description and the Figures.

DETAILED DESCRIPTION OF EXAMPLE EMBODIMENTS

Figure 1:
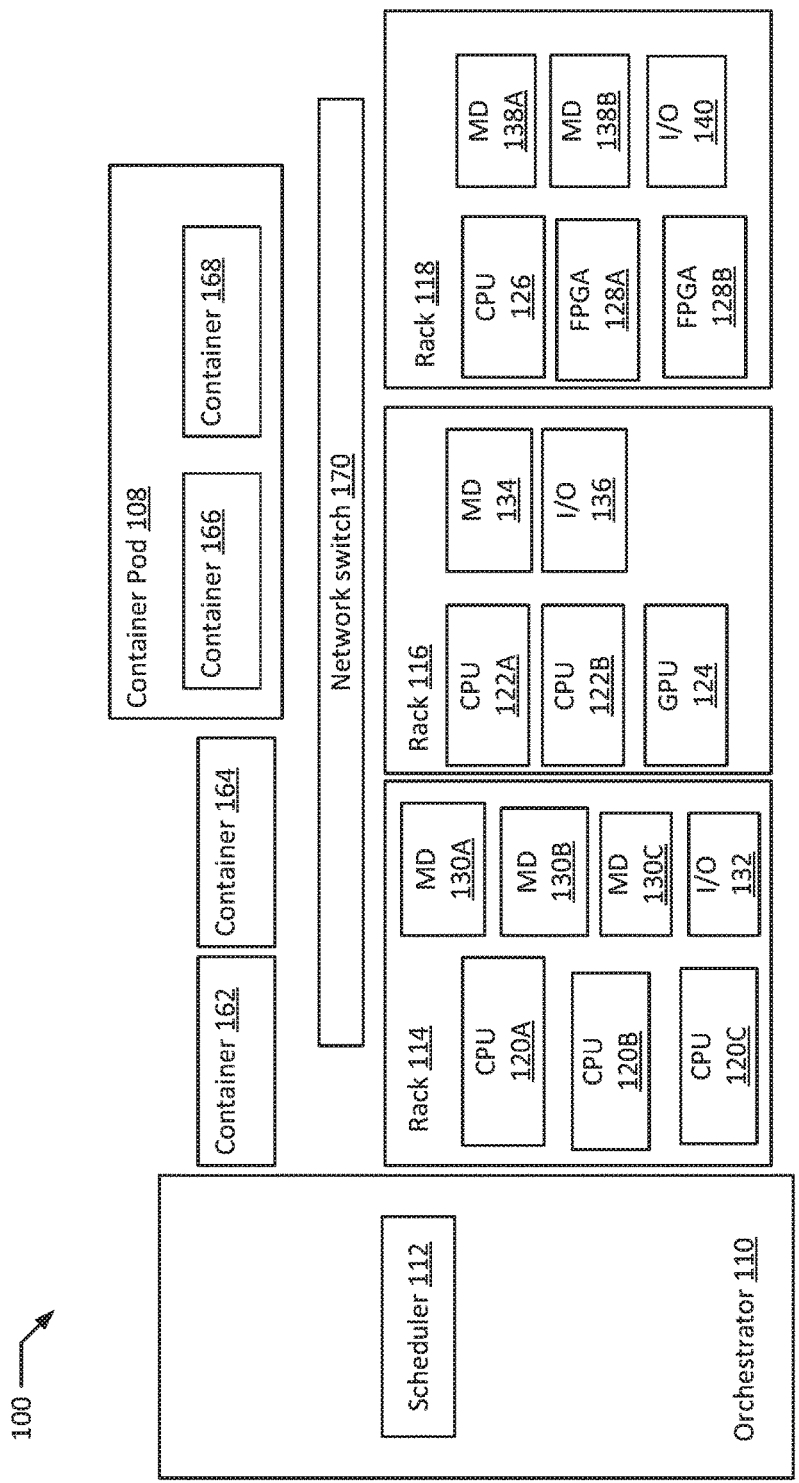
FIG. 1 is a block diagram of an example system according to an example of the present disclosure.

Described herein are methods and systems for cluster topology aware container scheduling for efficient data transfer.

A central processing unit ("CPU") is electronic circuitry within a computer that typically carries out the instructions of a computer program by performing the basic arithmetic, logical, control and input/output ("I/O") operations specified by the instructions. Before a CPU executes instructions, program instructions and data are typically placed into memory from an input device or a secondary storage device. Once the necessary data and instructions are in memory, the CPU may fetch the instructions from memory. Next, the CPU may decode the instructions and direct that the necessary data be moved from memory to an arithmetic/logic unit ("ALU"), which may execute the arithmetic or logical instructions. The ALU may store the result of this operation in memory or in a register. The CPU may eventually direct memory to release the result to an output device or a secondary storage device.

Some computers employ a multi-core processor, which is a single chip containing two or more CPUs called "cores." Architecturally, the CPU is composed of a few cores with a relatively large cache memory that can handle a few software threads at a time. In contrast, a Graphics Processing Unit ("GPU") is typically composed of hundreds of cores that can handle thousands of threads simultaneously. The ability of a GPU with 100+ cores to process thousands of threads can accelerate some software by 100 times over a CPU alone.

A GPU is a specialized electronic circuit designed to rapidly manipulate and alter memory to accelerate the creation of images intended for output to a display device. Modern GPUs are very efficient at manipulating computer graphics and image processing, and their highly parallel structure often makes them more efficient than general-purpose CPUs for processing large blocks of data in parallel. In a personal computer, a GPU can be present on a video card, or it can be embedded on the motherboard or—in certain CPUs—on the CPU die.

A field-programmable gate array ("FPGA") is an integrated circuit that can be programmed or reprogrammed to the required functionality or application after manufacturing. An FPGA includes logic blocks that are programmable, reconfigurable interconnects, and input/output pads. Therefore, operations that FPGAs can do are not predefined, so processes can be done in parallel. The ability of parallel processing is one of the most important features that separate FPGA from a CPU and make it superior in some areas. FPGAs are in many ways similar to programmable read-only memory chips. However, unlike programmable read-only memory chips, which generally are limited to hundreds of gates, FPGAs typically support several thousand gates. In some cases, FPGAs may be favorable over typical CPUs when dealing with data that must be processed quickly.

Recently, GPUs, FPGAs, and other specialized hardware components that generally accelerate specific types of computations (collectively "specialized hardware accelerators") have been virtualized, leading to their remote accessibility. A scheduler can be used for determining and deploying containers, or a cluster of containers like Kubernetes® Pods, to access these specialized hardware accelerators or access other types of servers, like CPUs. For a given container in a large environment, there may be hundreds or thousands of possible servers that have the physical capacity to host the container.

Although the specialized hardware accelerators offer desirable performance characteristics for some containers, they may be much scarcer than the standard CPU. Further, workload that uses both a mix of CPUs and specialized hardware accelerators may leave specialized hardware accelerators under utilized, so specialized hardware accelerators may be comparatively far more expensive, resulting in higher cost to the end user for use of the specialized hardware accelerator.

As previously noted, a scheduler may have the task of scheduling a given container in an environment where hundreds or thousands of servers are available to host the container. In an example, a scheduler may treat servers as fungible commodities, deploying a given container at random, or to the first server with the capacity to host the container. However, existing methods of scheduling containers on servers may lead to inefficient data transfer and may cause delays in job processing and completion. This also leads to the under utilization of specialized hardware accelerators. Further, a scheduler generally may not read the contents of a request/container to determine whether a request/container that utilizes a specialized hardware accelerator needs to be prioritized. Moreover, existing scheduling systems are typically unaware of or do not consider cluster topology of servers in racks, the connections between the various racks or the topology of server clusters when determining where to schedule containers, thus may not efficiently or optimally utilize the specialized hardware accelerators in the system.

For example, an existing scheduler may be scheduling three jobs, where the first job includes encrypting a large amount of confidential data, such as credit card information of all of a website's users, which may see significant performance gains using a specialized hardware accelerator. The second job includes service of an encrypted video stream, which may see moderate performance gains using the specialized hardware accelerator. The third job includes copying an encrypted image file that may see no performance gain using the specialized hardware accelerator. Although both of the first and second jobs may be aided by the use of a specialized hardware accelerator, the scheduler may schedule these three jobs without regard for the cluster topology, which may result in inefficient data transfer between clusters to enable accessing of specialized hardware accelerators. For example, the third job may be scheduled on a rack with a specialized hardware accelerator, and therefore the third job takes up server capacity that could have otherwise been used for the first and/or second jobs, thereby causing delays in handling of the first and/or second jobs. A scheduler unaware of the architectural topology of the server system may not be able to schedule jobs efficiently to utilize the specialized hardware accelerators quickly and efficiently for priority requests. Therefore, there may be an additional, and unnecessary, amount of latency because the servers may need to access network switches before processing the requests at the specialized hardware accelerator.

Further, the scheduler may not consider priority levels of any of these jobs to optimize or maximize utilization of the specialized hardware accelerator. If both of the requests for the first and second jobs are handled by placing containers on random racks, the system may not use the specialized hardware accelerator efficiently. For example, the scheduler may by chance assign the first job to a rack with the specialized hardware accelerator, and assign the second job to a rack without the specialized hardware accelerator. However, if the second job requires real-time processing, for example, for a confidential video conference, the latency of requesting data from the specialized hardware accelerator may degrade quality of service, which may in turn force the second job to be processed only in the rack, without the specialized hardware accelerator. This uses much more capacity of the servers than necessary, without the specialized hardware accelerator, resulting in a less efficient use of data processing capacity in the system as a whole if the first job did not require real time processing (e.g., for a credit card data backup process).

Aspects of the present disclosure may address the above noted deficiencies by employing cluster topology aware container scheduling for efficient data transfer. This is done by enabling a scheduler to schedule jobs to either an inner ring of servers, which has a specialized hardware accelerator, or an outer ring of servers, which does not have a specialized hardware accelerator, in order to utilize the specialized hardware accelerator most efficiently. The jobs are scheduled based on an allowed latency tolerance for each job, which will optimize the use of the specialized hardware accelerators. For example, the above described first and second jobs both benefit from being scheduled in the inner ring, but the second job may be scheduled in the inner ring because it has a real time latency tolerance, even though the second job may realize a smaller performance gain using the specialized hardware accelerator than the first job. Rather, because the first job has a batch latency tolerance, it may only be scheduled on the inner ring if there is sufficient capacity on the inner ring after all real time tolerance jobs that use the specialized hardware accelerator are scheduled. If there is insufficient capacity in the inner ring, the first job may only be scheduled in the outer ring. The third job may be scheduled on the outer ring of servers since it does not benefit from being on the same rack as the specialized hardware accelerator. Accordingly, the present disclosure improves upon the existing schedulers by advantageously limiting the amount of data transfer across network switches between inner rings and outer rings through cluster topology aware container scheduling.

FIG. 1 depicts a high-level component diagram of an example system 100 for different availability and performance requirements. The system 100 may include, for example, an orchestrator 110, a network switch 170, and racks 114, 116, and 118. The orchestrator 110 may include a scheduler 112. The system 100 may also include, for example, one or more container pods 108 and/or one or more containers 162 and 164. The container pod 108 consists of containers 166 and 168.

Rack 114 includes one or more CPU servers 120A, 120B, and 120C, one or more memory devices 130A, 130B, and 130C, and one or more I/O devices 132. Rack 116 includes one or more CPU servers 122A and 122B, one or more specialized hardware accelerators, for example GPU server 124, one or more memory devices 134, and one or more I/O devices 136. Rack 118 includes one or more CPU servers 126, one or more specialized hardware accelerators, for example FPGA server 128A and 128B, one or more memory devices 138A and 138B, and one or more I/O devices 140.

The scheduler 112 schedules container pod 108 and/or containers 162 and 164 to the servers inside racks 114, 116, and 118. As discussed herein, a rack (e.g., rack 114, rack 116, and rack 118) refers to physical server racks, for example, in a data center that may host thousands of servers. Either rack 116 or rack 118 is part of an inner ring of servers because both racks 116 and 118 include a specialized hardware accelerator (e.g., GPU 124 and FPGAs 128A and 128B) physically included in the rack and connected to other hardware components on the rack. Either rack 116 or 118 may be included in an inner ring of servers depending on which is architecturally configured to perform a specialized computation. For example, rack 116 may be configured to perform a required type of specialized computation, and rack 118 may not be configured to perform this type of specialized computation. In this example, rack 118 is then a part of an outer ring of servers. In an alternative example, rack 118 may be configured to perform a different required type of specialized computation and rack 116 may not be configured to perform this different type of specialized computation. Therefore, in this example, rack 118 is a part of the inner ring of servers, and rack 116 is part of the outer ring of servers. Additionally, rack 114 is part of an outer ring of servers because rack 114 contains no specialized hardware accelerators that perform the specialized computation, but is connected to the inner ring of servers (e.g., either rack 116 or rack 118) via the network switch 170. Therefore, rack 114, as well as any other racks in the outer ring of servers, can access one of the specialized hardware accelerators (e.g., 124, 128A, and 128B) via the network switch 170. In an example, a network switch may be physically located in each individual rack (e.g., racks 114, 116, and 118). In another example, a network switch may be distributed over several racks (e.g., racks 114, 116, and 118).

As discussed herein, a memory device refers to a volatile or non-volatile memory device, such as RAM, ROM, EEPROM, or any other device capable of storing data. As used herein, processors (e.g., CPUs and specialized hardware accelerators) refer to a device capable of executing instructions encoding arithmetic, logical, and/or I/O operations. In one illustrative example, processors may follow Von Neumann architectural model and may include an arithmetic logic unit (ALU), a control unit, and a plurality of registers. In a further aspect, CPUs may be a single core processor which is typically capable of executing one instruction at a time (or process a single pipeline of instructions), or a multi-core processor which may simultaneously execute multiple instructions. In another aspect, CPUs and specialized hardware accelerators may be implemented as a single integrated circuit, two or more integrated circuits, or may be a component of a multi-chip module (e.g., in which individual microprocessor dies are included in a single integrated circuit package and hence share a single socket). CPUs and specialized hardware accelerators may be interconnected using a variety of techniques, ranging from a point-to-point processor interconnect, to a system area network, such as an Ethernet-based network. In an example, all of the disclosed methods and procedures described herein can be implemented by the one or more CPUs and specialized hardware accelerators. Further, the system 100 may be distributed over multiple processors, memories, and networks.

The system 100 may also include an input/output devices (e.g., a network device, a network interface controller (NIC), a network adapter, any other component that connects a computer to a computer network, a peripheral component interconnect (PCI) device, storage devices, sound or video adaptors, photo/video cameras, printer devices, keyboards, displays, etc.), for example the I/O 132, 136, and 140 coupled to the CPUs and/or specialized hardware accelerators.

Figure 2:
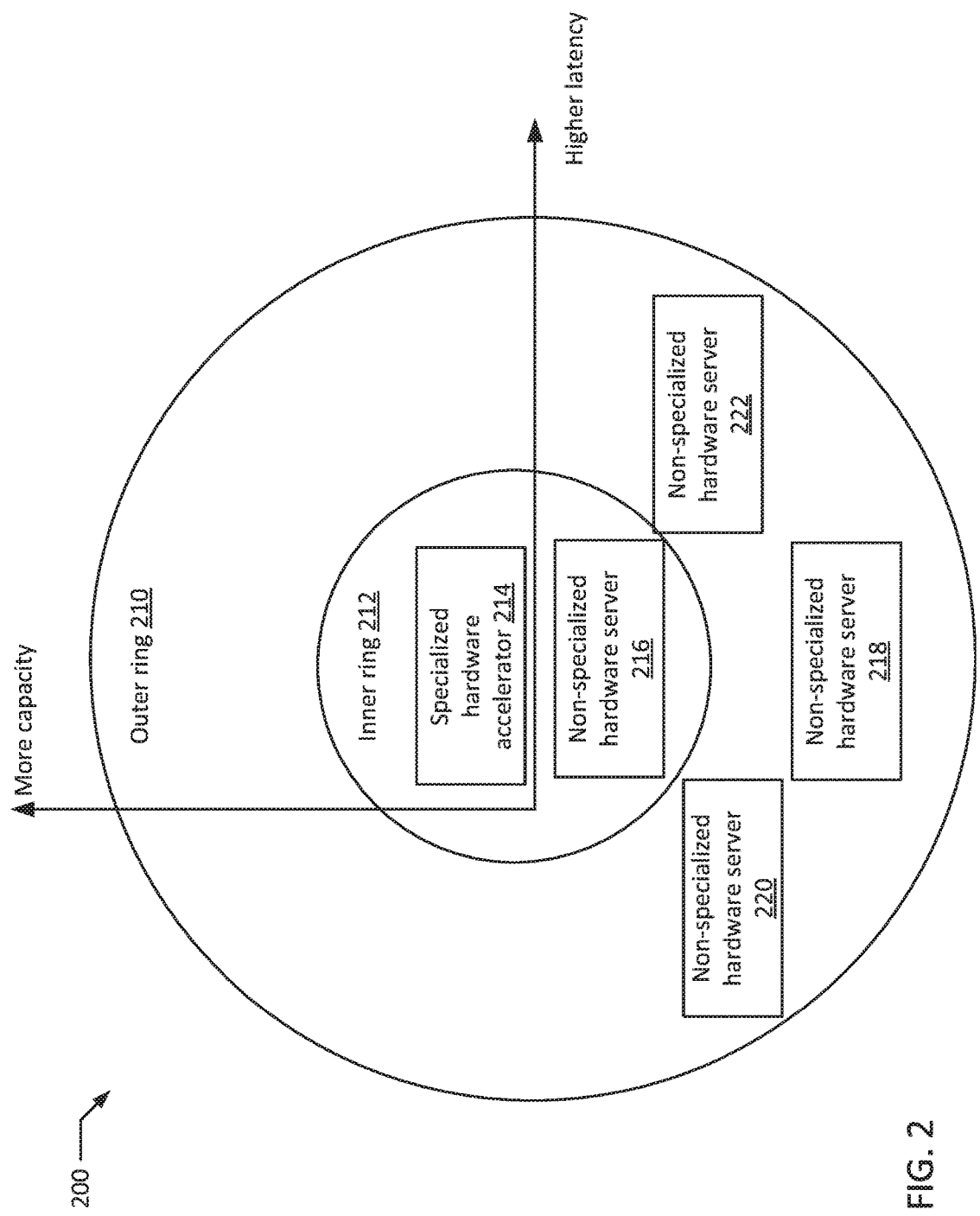
FIG. 2 is a block diagram of an example system according to an example of the present disclosure.

FIG. 2 illustrates a block diagram of a system 200 according to an example of the present disclosure. The example system 200 depicts an outer ring of severs 210 and an inner ring of servers 212. The outer ring of servers 210 contains non-specialized hardware servers 218, 220, and 222 (e.g., CPUs). The inner ring of servers 212 contains one or more specialized hardware accelerators 214 (e.g., GPU, FPGA) and one or more non-specialized hardware servers 216 (e.g., CPU).

As depicted by the horizontal arrow in FIG. 2, when a container benefiting from the use of the specialized hardware accelerator is executed, the outer ring of servers 210 performs with higher latency than the inner ring of servers 212. This means, for example, that containers scheduled to execute in the outer ring of servers 210 are more likely to have a greater delay in response time than those containers scheduled to the inner ring of servers 212.

As depicted by the vertical arrow in FIG. 2, when a container benefiting from the use of the specialized hardware accelerator is scheduled, capacity to execute containers is checked from the inner ring of servers 212 to the outer ring of servers 210. For example, when the latency tolerance of a container is read by the orchestrator to be a batch tolerance, if there is capacity for a container to be scheduled in the inner ring of servers 212, then the scheduler will schedule the container to the inner ring of servers 212. Alternatively, for example, if there is no capacity for a container to be scheduled to the inner ring of servers 212, the scheduler will schedule the container to be executed in the outer ring of servers 210.

FIG. 2 depicts only two rings: an inner ring of servers 212 and an outer ring of servers 210. However, this is merely an example architecture, and there can be more rings outside the illustrated outer ring 210. For example, there can be a second outer ring of servers, a third outer ring of servers, etc. outside the illustrated outer ring 210, each ring of servers being separated by at least a network switch, and possibly other network components. These subsequent outer rings of servers are located at different data centers, or different geographic locations or regions, than the inner ring of servers 212. In an example, the other outer rings of servers may communicate with the inner ring of servers 212 or the outer ring of servers 210 via a network. The network may be a public network (e.g., the Internet), a private network (e.g., a local area network (LAN) or wide area network (WAN)), or a combination thereof.

Figure 3:
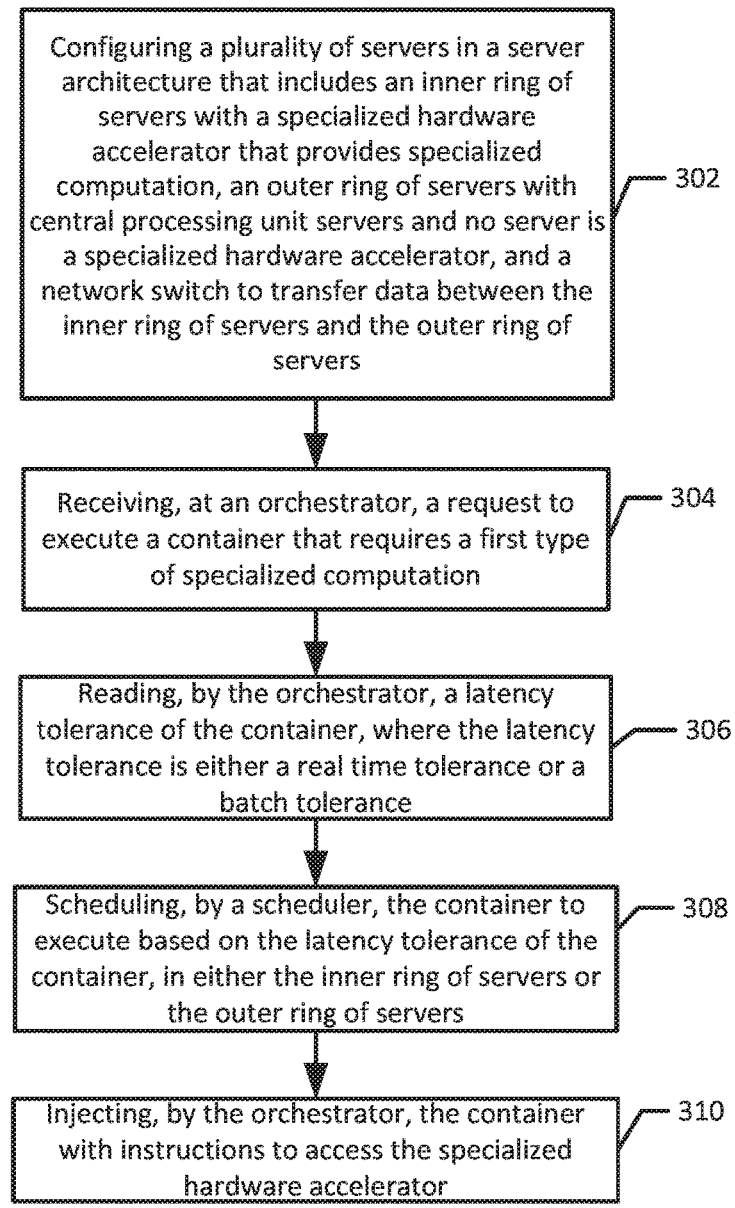
FIG. 3 is a flowchart illustrating an example method of operating a system for cluster topology aware container scheduling for efficient data transfer according to an example of the present disclosure.

FIG. 3 shows a flowchart of an example method 300 of operating the system 100 according to an example of the present disclosure. Although the example method 300 is described with reference to the flowchart illustrated in FIG. 3, it will be appreciated that many other methods of performing the acts associated with the method may be used. For example, the order of some of the blocks may be changed, certain blocks may be combined with other blocks, and some of the blocks described are optional.

The illustrated example 300 begins with configuring a plurality of servers in a server architecture that includes an inner ring of servers with a specialized hardware accelerator that provides specialized computation, an outer ring of servers with central processing unit servers and no server is a specialized hardware accelerator, and a network switch to transfer data between the inner ring of servers and the outer ring of servers (block 302). For example, a public cloud provider may configure racks 114, 116, and 118 as depicted in FIG. 1. Either of racks 116 or 118, as explained previously, may be part of the inner ring of servers because either of racks 116 or 118 may have a server architecture configured to perform a specialized computation by the specialized hardware accelerators (e.g., GPU 124 and FPGA 128A and 128B). Rack 114 is part of the outer ring of servers.

Next, the orchestrator receives a request to execute a container that requires a first type of specialized computation (block 304). For example, container 162 may be associated with a request to access a website that requires encryption of large amounts of private user information. Container pod 108 may be associated with a request to identify/recognize an image in an artificial intelligence neural network ("ANN"). The processing of both of these requests may benefit from the use of a specialized hardware accelerator. It should be appreciated that a specialized hardware accelerator may be specifically created as an artificial-intelligence ("AI") accelerator, a three-dimensional ("3D") accelerator, a cryptographic accelerator, etc.

Next, the orchestrator reads a latency tolerance of the container, where the latency tolerance is either a real time tolerance or a batch tolerance (block 306). The latency tolerance, for example, may be read from the container's metadata. For example, container 162, to encrypt user information, may have a real time tolerance due to the time sensitive nature of the job. The container pod 108, to identify/recognize an image in an ANN, may have a batch tolerance because the job is not time sensitive, and a higher latency is acceptable.

Next, the scheduler schedules the container to execute based on the latency tolerance of the container, in either the inner ring of servers or the outer ring of servers (block 308). For example, the container 162, to encrypt user information, would be scheduled to execute on the inner ring of servers because it has a real time tolerance. However, depending on capacity of the inner ring of servers, container pod 108, which identifies/recognizes an image in an ANN, may be scheduled to execute on either the inner ring of servers or the outer ring of servers. More detail on scheduling will be provided in the description of FIGS. 4A-4C below.

Next, the orchestrator injects the container with instruction on how to access the specialized hardware accelerator (block 310). For example, based on where the container is scheduled to execute, the orchestrator will inject the container with a specific set of instructions on how to access the specialized hardware accelerator from either the inner ring of servers or the outer ring of servers.

Figure 4A:
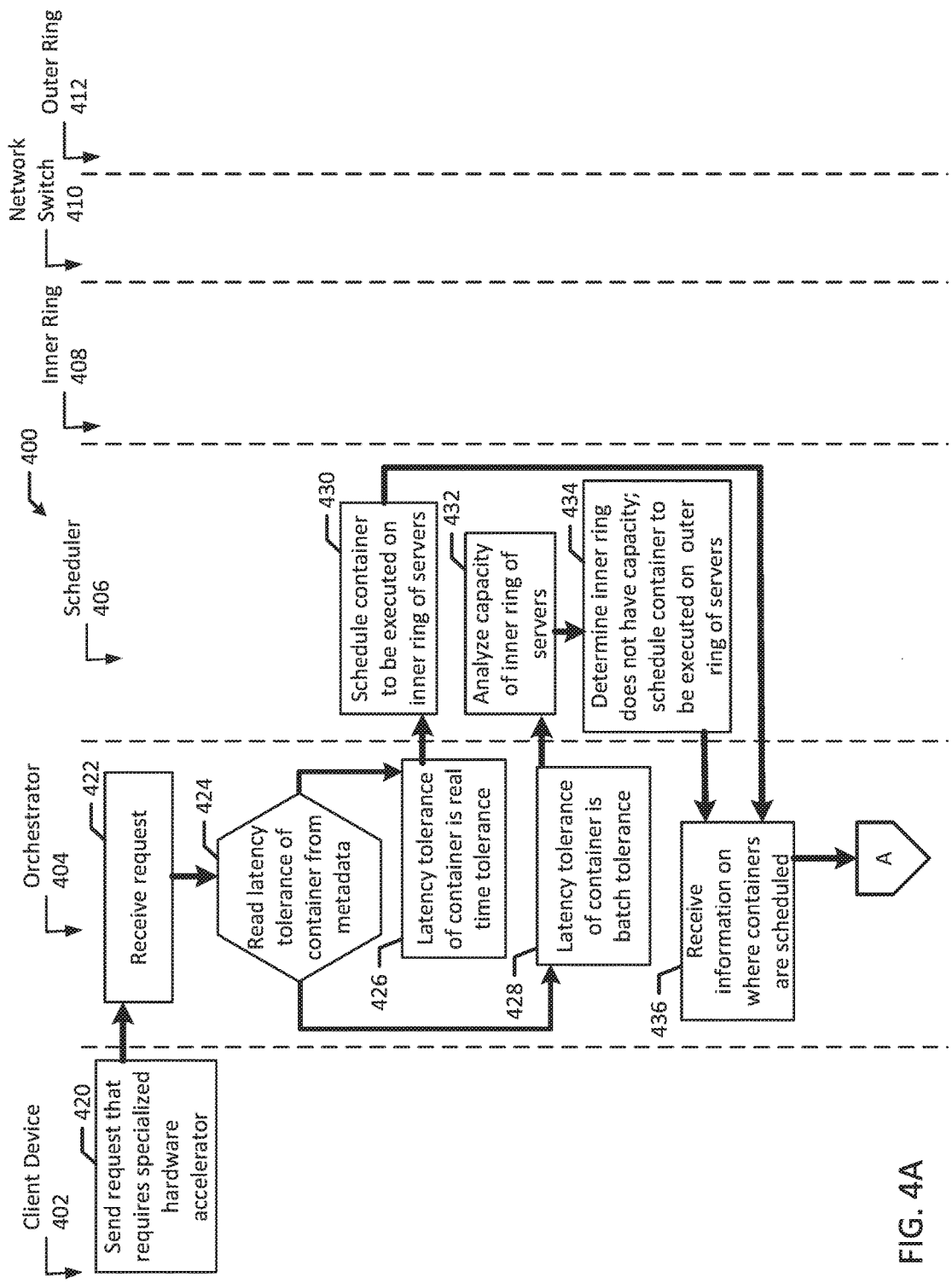
FIGS. 4A, 4B, and 4C are a flow diagram illustrating example methods of operating a system for cluster topology aware container scheduling for efficient data transfer according to an example of the present disclosure.
Figure 4B:
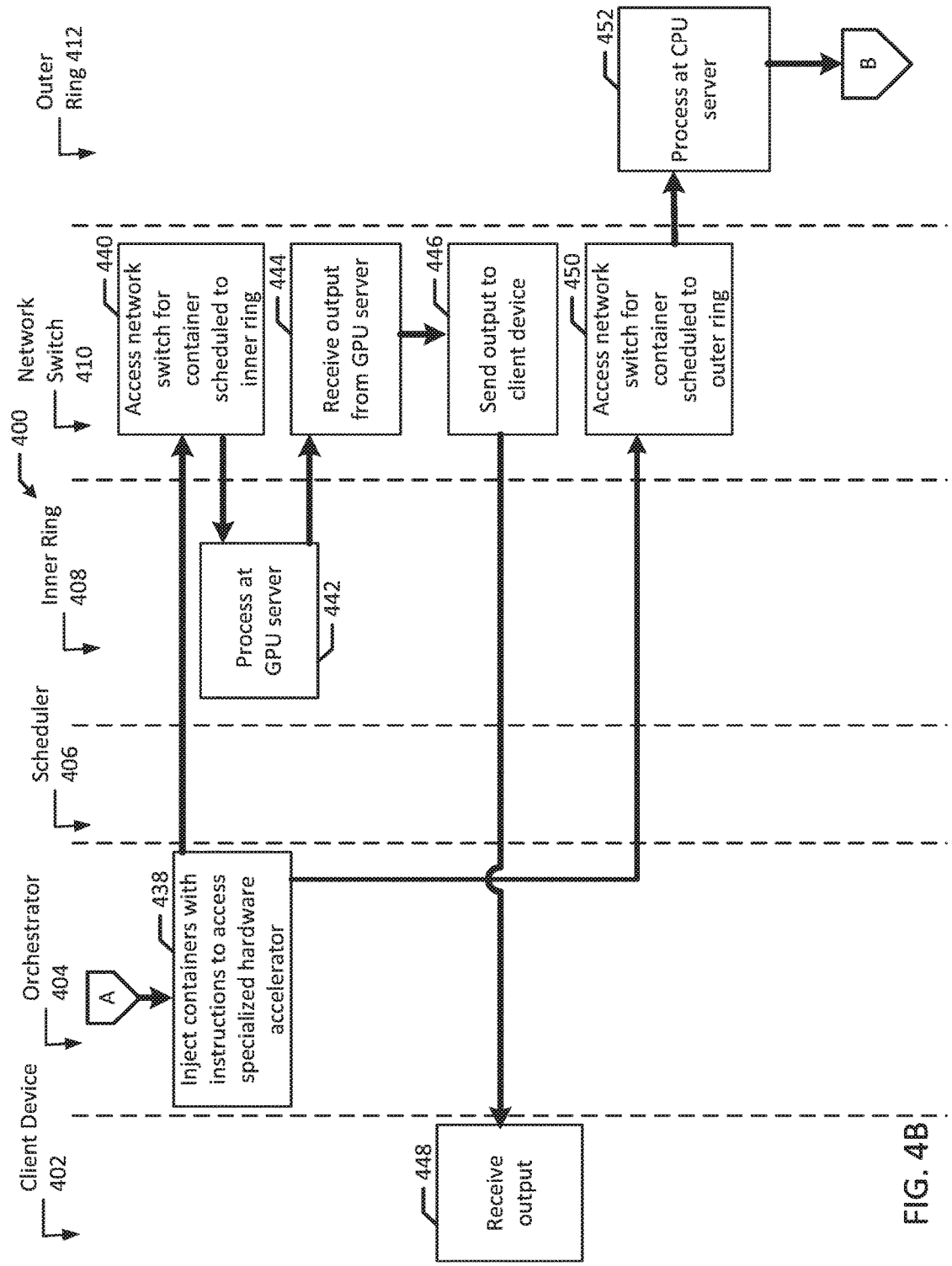
Figure 4C:
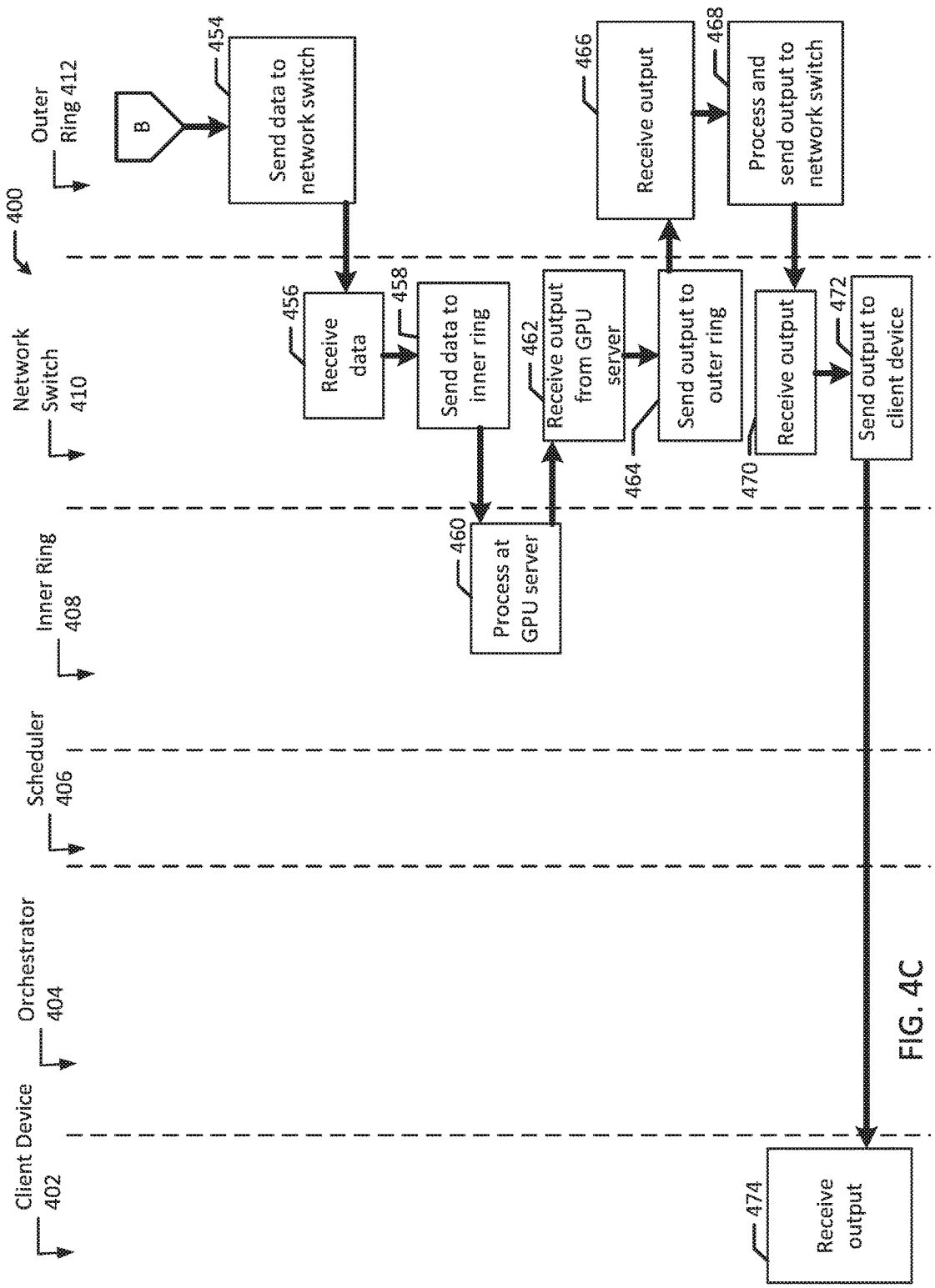

FIGS. 4A-4C show a flowchart of an example method 400 for a system for cluster topology aware container scheduling for efficient data transfer. Although the example method 400 is described with reference to the flowchart illustrated in FIGS. 4A-4C, it will be appreciated that many other methods of performing the acts associated with the method may be used. For example, the order of some of the blocks may be changed, certain blocks may be combined with other blocks, and some of the blocks described are optional. The method 400 may be performed by processing logic that may include hardware (circuitry, dedicated logic, etc.), software, or a combination of both. For example, the method 400 may be performed by a system including a client device 402, an orchestrator 404, a scheduler 406, an inner ring of servers 408, an outer ring of servers 412, and a network switch 410.

In the illustrated example, the client device 402 sends a request to the orchestrator 404 that requires use of the specialized hardware accelerator (block 420). For example, the request can be any request that requires, or would be aided by, the use of a specialized hardware accelerator. The specialized hardware accelerator may be, for example, a GPU, FPGA, or any other device that has the ability to process large blocks of data in parallel, giving the specialized hardware accelerator higher computational capacity. For example, client device 402 sends a special request to the orchestrator 404 to decode a video.

Then the orchestrator 404 receives the request (block 422), and reads a latency tolerance of the container from the container's metadata (block 424). For example, the orchestrator 404 receives the request from the client device 402, and reads the latency tolerance from the metadata of the container that is configured to decode the video as requested by the client device 402. In another example, the orchestrator may determine a latency tolerance of a container by using a lookup table maintained in the orchestrator. Also, for example, the orchestrator may determine a latency tolerance of a container heuristically. In another example, the client device 402 may specify a latency tolerance of the container.

If the read latency tolerance of the container is a real time tolerance (block 426), a scheduler 406 schedules the container to be executed on the inner ring of servers 408 (block 430). For example, if the orchestrator 404 reads the latency tolerance of the container from the container's metadata, and determines the container has a real time latency tolerance, the scheduler 406 will schedule the container to be executed by the inner ring of servers 408. The inner ring of servers 408 contains a specialized hardware accelerator, which will make processing of a request, such as decoding a video, occur more rapidly. However, because the real time requests will always be scheduled at the inner ring of servers 408, even if processing of the request cannot occur right way because there is no capacity, the request will have to wait to access the specialized hardware accelerator. In this case, a notification may be sent to client device 402 to notify a requestor of the delay in processing.

If the read latency tolerance of the container is a batch tolerance (block 428), the scheduler 406 will analyze the capacity of the inner ring of servers 408 (block 432). If the inner ring of servers 408 does not have the capacity to execute the container, the container will be scheduled to execute on the outer ring of servers 412 (block 434). For example, if the orchestrator 404 reads the metadata of a container to be a batch tolerance, the scheduler 406 will analyze the capacity of the inner ring of servers 408 to process the container. If the inner ring of servers 408 has no capacity, or fails to meet a threshold of available capacity, the container will be scheduled to execute on the outer ring of servers 412. However, alternatively, if the inner ring of servers 408 has capacity, or meets a threshold of available capacity, the container may be scheduled to execute on the inner ring of servers 408.

After block 430 and/or 434, the scheduler 406 sends the scheduling information to the orchestrator 404, and the orchestrator 404 receives information on where the containers are scheduled to execute (block 436). For example, the scheduler 406 sends the scheduling information of the containers back to the orchestrator 404.

Next, after receiving the scheduling information of the containers, the orchestrator 404 injects the containers with instructions to access the specialized hardware accelerator (block 438). For example, orchestrator 404 injects the containers with instructions to access the specialized hardware accelerator based on where the containers are scheduled. In an example, prior to this moment in the method, the containers may not have information on how to access either the inner ring of servers 408 or the outer ring of servers 412. In an alternative example, the containers may already have the necessary information, or part of the necessary information, to access the inner ring of servers 408 or the outer ring of servers 412, however, may lack the required authorization to access the inner ring of servers 408 or the outer ring of servers 412. Also, for example, the containers may specifically access the specialized hardware accelerator directly, in contrast to generally accessing the inner ring of servers 408.

If the container is scheduled to the inner ring of servers 408, the orchestrator 404 next accesses the network switch 410 to launch the container in the inner ring of servers 408 (block 440). The container is executed in the inner ring of servers 408 by a GPU server which performs the required specialized computation (block 442). Although the example in FIG. 4B demonstrates that the container is processed by a GPU server in the inner ring of servers 408, the container may be processed by any specialized hardware accelerator. For example, the GPU server in block 442 may be replaced by an FPGA server, etc.

Next, the network switch 410 receives an output from the GPU server (block 444), and sends that output to the client device 402 (block 446). For example, the result of any processing done in the inner ring of servers 408 at the GPU server is sent to the network switch 410. The network switch 410 sends those results to the client device 402. Next, the client device 402 receives the output (block 448).

Alternatively, at block 438, if the container is scheduled to the outer ring of servers 412, the container next accesses the network switch 410 (block 450), and the container is launched at a CPU in the outer ring of servers (block 452). Next, data from the container, which may include a request to access the GPU server, is sent to the network switch 410 from the outer ring of servers 412 (block 454), and received at the network switch 410 (block 456), in order to be sent to the inner ring of servers 408 (block 458). The data and request are processed in the inner ring of servers 408 by the GPU server (block 460). Next, the network switch 410 receives an output from the GPU server (block 462), and the network switch 410 sends the output to the outer ring of servers 412 (block 464). The outer ring of servers 412 then receives the output (block 466), and processes and sends the output from the outer ring of servers 412 back to the network switch 410 (block 468) to be sent to client device 402. The outer ring 412 may or may not process the output depending on a variety of factors. These factors may include, but are not limited to, the type of request, the type of response/output, instructions from an administrator, the type of client device to receive the response/output, etc.

Next, the network switch 410 receives the output from the outer ring of servers 412 (block 470), and sends the output to the client device 402 (block 472). The client device 402 then receives the output (block 474). In the example flow diagram of FIGS. 4A-4C, the request scheduled to execute on the outer ring of servers 412 was processed by the inner ring of servers 408 only once at block 460. However, it may typically be the case that a specialized hardware accelerator needs to be accessed more than once to complete processing, necessitating multiple communications across the network switch 410. As is evidence from FIGS. 4A-4C, the latency in the processing of a container scheduled to the outer ring of servers 412 may be much higher than the latency in the processing of a container scheduled to the inner ring of servers 408.

Specialized processing on a particular container scheduled to the inner ring of servers 408, meaning the container is on the same rack as the specialized hardware accelerator, may take anywhere from milliseconds to nanoseconds. Processing a container scheduled to the outer ring of servers 412 (e.g., the next rack, connected by the network switch 410 to the inner ring of servers 408) may take anywhere from tens of milliseconds to hundreds of milliseconds. Processing a container scheduled to a second, third, etc. outer ring of servers (e.g., connected to the inner ring of servers 408 or outer ring of servers 412 via a network, but located at a different data center) may take thousands of milliseconds.

Figure 5:
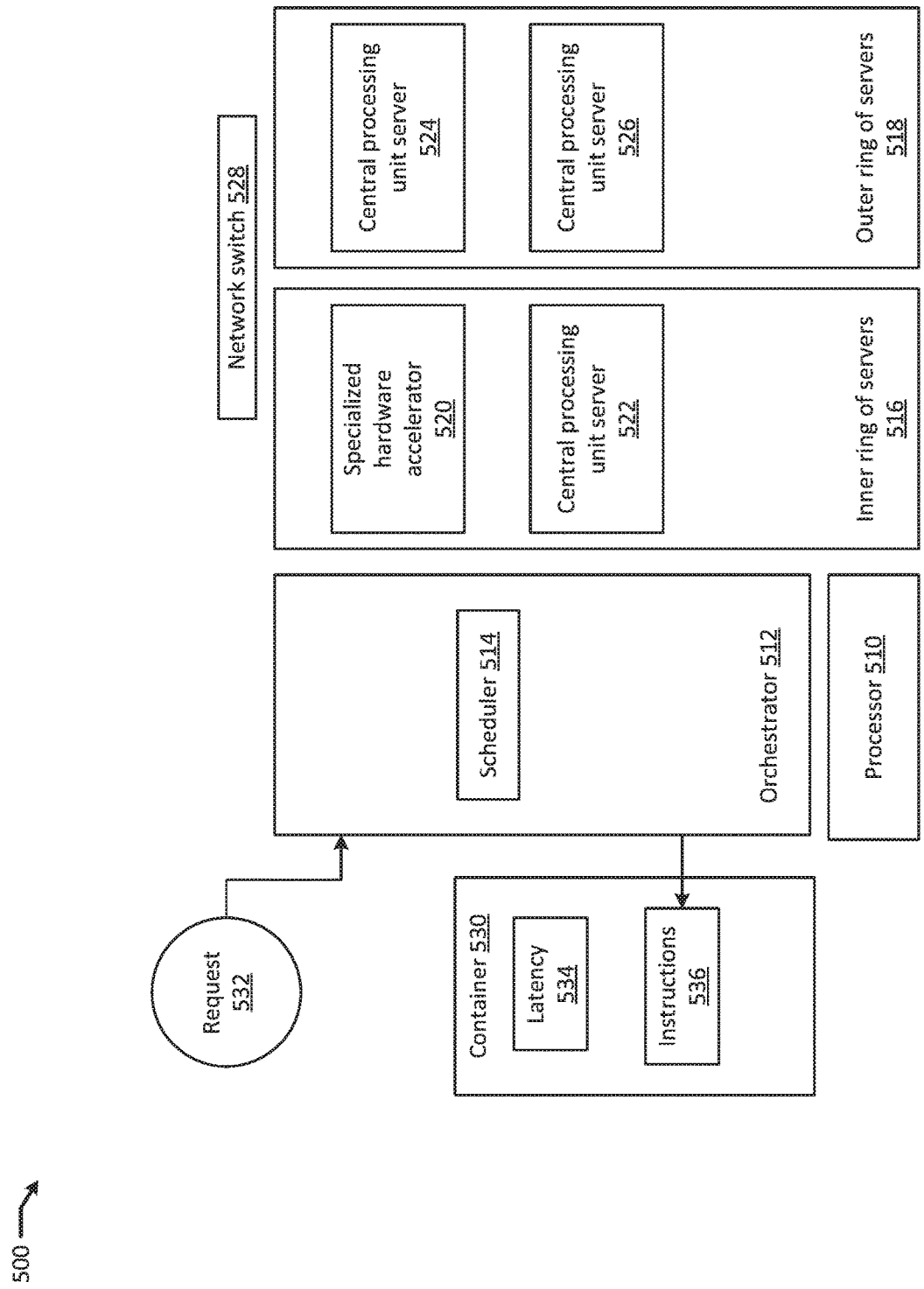
FIG. 5 is a block diagram of an example system according to an example of the present disclosure.

FIG. 5 is a block diagram of an example system according to an example of the present disclosure. As illustrated in FIG. 5, an example system 500 may include a processor 510, and an orchestrator 512 executing on the processor 510. The orchestrator 512 may include a scheduler 514 that also executes on the processor 510.

The example system 500 also includes an inner ring of servers 516, an outer ring of servers 518, a network switch 528, a container 530, and a request 532. The inner ring of servers 516 may have a plurality of servers, a specialized hardware accelerator 520, which provides a specialized computation, and a central processing unit server 522. The outer ring of servers 518 includes a plurality of servers, such as central processing unit servers 524 and 526. None of the servers in the outer ring of servers 518 provides the specialized computation of the specialized hardware accelerator 520. The network switch 528 is used to transfer data between the inner ring of servers 516 and the outer ring of servers 518. The container 530 has a latency tolerance 534, and instructions 536.

The processor 510 is configured to have the orchestrator 512 receive a request 532. The request 532 is to execute the container 530, where the container 530 requires the specialized computation of the specialized hardware accelerator 520. The orchestrator 512 reads the latency tolerance 534 of the container 530. The latency tolerance 534 is either a real time tolerance or a batch tolerance. The scheduler 514 schedules the container 530 to execute in either the inner ring of servers 516 or the outer ring of servers 518 based on the latency tolerance 534 of the container 530. The orchestrator 512 injects the container 530 with instructions 536 to access the specialized hardware accelerator 520.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as GPUs, CPUs, ASICs, FPGAs, DSPs or any other similar devices. The instructions may be configured to be executed by one or more processors, which when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
    configuring a server architecture including a first plurality of servers that includes:
        an inner ring of servers, wherein the inner ring of servers includes a second plurality of servers including at least a first server, the first server being a specialized hardware accelerator that provides a first type of specialized computation;
        an outer ring of servers, wherein the outer ring of servers includes a third plurality of central processing unit servers and no server in the outer ring of servers provides the first type of specialized computation of the specialized hardware accelerator; and
        a network switch to transfer data between the inner ring of servers and the outer ring of servers;
    receiving, at an orchestrator, a request to execute a first container, wherein the first container requires the first type of specialized computation;
    reading, by the orchestrator, a first latency tolerance of the first container, wherein a latency tolerance of a respective container is one of a real time tolerance and a batch tolerance, and the first latency tolerance is the batch tolerance;
    responsive to determining the first latency tolerance of the first container is the batch tolerance, analyzing, by a scheduler, a first capacity of the inner ring of servers and a second capacity of the outer ring of servers;
    determining, by the scheduler, that the first capacity fails to meet a threshold, wherein the scheduler is configured to schedule containers in one of the inner ring of servers and the outer ring of servers;
    scheduling, by the scheduler, the first container to execute, based on the first latency tolerance of the first container, in the outer ring of servers; and
    injecting, by the orchestrator, the first container with instructions to access the specialized hardware accelerator.

2. The method of claim 1, wherein a second latency tolerance of a second container is the real time tolerance.

3. The method of claim 2, wherein responsive to determining the second latency tolerance of the second container is the real time tolerance, the second container is scheduled to be processed by the inner ring of servers.

4. The method of claim 1, wherein a second latency tolerance of a second container is the batch tolerance.

5. The method of claim 4, further comprising:
    responsive to determining the second latency tolerance of the second container is the batch tolerance, analyzing, by the scheduler, the first capacity of the inner ring of servers;
    determining, by the scheduler, that the first capacity meets the threshold; and
    scheduling, by the scheduler, the second container to execute in the inner ring of servers.

6. The method of claim 1, wherein the specialized hardware accelerator is one of a graphics processing unit and a field-programmable gate array.

7. The method of claim 1, wherein the first latency tolerance of the first container is read from a metadata tag in the first container.

8. A system comprising:
    one or more processors;
    an orchestrator executing on the one or more processors;
    a scheduler executing on the one or more processors;
    an inner ring of servers, wherein the inner ring of servers includes a first plurality of servers including at least a first server, the first server being a specialized hardware accelerator that provides a first type of specialized computation;
    an outer ring of servers, wherein the outer ring of servers includes a second plurality of central processing unit servers and no server in the outer ring of servers provides the first type of specialized computation of the specialized hardware accelerator; and
    a network switch to transfer data between the inner ring of servers and the outer ring of servers,
    wherein the one or more processors are configured to:
        receive, at the orchestrator, a request to execute a first container, wherein the first container requires the first type of specialized computation, read, by the orchestrator, a first latency tolerance of the first container, wherein a latency tolerance of a respective container is one of a real time tolerance and a batch tolerance, responsive to determining the first latency tolerance of the first container is the batch tolerance, analyzing, by the scheduler, a first capacity of the inner ring of servers and a second capacity of the outer ring of servers, determining, by the scheduler, that the first capacity fails to meet a threshold, wherein the scheduler is configured to schedule containers in one of the inner ring of servers and the outer ring of servers, schedule, by the scheduler, the first container to execute, based on the first latency tolerance of the first container, in the outer ring of servers, and inject, by the orchestrator, the first container with instructions to access the specialized hardware accelerator.

9. The system of claim 8, further comprising:
a plurality of racks, wherein each rack includes at least two servers.

10. The system of claim 9, wherein the inner ring of servers includes at least two racks, and one of the at least two racks includes at least one specialized hardware accelerator.

11. The system of claim 9, wherein the outer ring of servers includes a plurality of racks.

12. The system of claim 8, further comprising:
a second outer ring of servers, wherein the second outer ring of servers includes a plurality of racks, wherein each rack includes at least one server;
a second network switch to transfer data between the second outer ring and the outer ring; and
a third plurality of central processing unit servers, wherein no server in the second outer ring of servers provides the first type of specialized computation of the specialized hardware accelerator.

13. The system of claim 8, wherein a second latency tolerance of a second container is the real time tolerance, and the second container is scheduled to be processed by the inner ring.

14. The system of claim 8, wherein a second latency tolerance of a second container is the batch tolerance.

15. The system of claim 14, wherein responsive to determining the second latency tolerance of the second container is the batch tolerance, the second container is scheduled to be processed by the inner ring.

16. The system of claim 8, wherein the specialized hardware accelerator is a graphics processing unit.

17. The system of claim 8, wherein the specialized hardware accelerator is a field-programmable gate array.

18. A non-transitory machine readable medium storing instructions, which when executed by one or more physical processors, cause the one or more physical processors to:
receive, at an orchestrator, a request to execute a first container, wherein the first container requires a first type of specialized computation;
read, by the orchestrator, a first latency tolerance of the first container, wherein a latency tolerance of a respective container is one of a real time tolerance and a batch tolerance, and the first latency tolerance is the batch tolerance;
responsive to determining the first latency tolerance of the first container is the batch tolerance, analyze, by a scheduler, a first capacity of an inner ring of servers and a second capacity of an outer ring of servers;
determine, by the scheduler, that the first capacity fails to meet a threshold, wherein the scheduler is configured to schedule containers in one of the inner ring of servers and the outer ring of servers;
schedule, by the scheduler, the first container to execute, based on the first latency tolerance of the first container, in the outer ring of servers; and
inject, by the orchestrator, the first container with instructions to access a specialized hardware accelerator.

* * * * *